Patented May 2, 1950

2,506,344

UNITED STATES PATENT OFFICE 2,506,344

METHOD FOR MAKING THIOPHOSPHATES

Thomas F. Cleary, Jr., New Brunswick, N. J., assignor to The Plant Products Corporation, Blue Point, N. Y., a corporation of New York No Drawing. Application March 9, 1948, Serial No. 13,949

3 Claims. (Cl. 260—461)

This invention relates to esters of monothiophosphoric acid, particularly to mixed aryl alkyl esters thereof.

Esters of monothiophosphoric acid wherein one of the hydrogens of monothiophosphoric acid has been replaced with an aryl or a substituted aryl radical and the other two hydrogens of which have been replaced with alkyl or substituted alkyl radicals are finding increasing usage in the field of addition agents for lubricants, agents for treating cloth and as insecticides and fungicides. In particular, diethyl p-nitrophenyl monothiophosphate has been shown to be highly toxic to a wide variety of insect pests. The value of improved methods for the preparation of such esters is apparent.

It has now been found that a monoaryl dialkyl monothiophosphate can be prepared readily and in excellent yield by reacting about two molecular proportions of an alkanol with about one molecular proportion of a monoaryl monothiophosphoric acid dihalide. The dihalide can be prepared in excellent yield by heating a monoaryl phosphorous acid dihalide with elemental sulfur and the monoaryl phosphorous acid dihalide can be prepared conveniently and in high yield by reacting a phosphorous trihalide with about one molecular equivalent of a phenol.

Monoaryl monothiophosphoric acid dihalides containing one or more substituents on the aryl nucleus can be used, if desired, and correspondingly substituted monoaryl dialkyl monothiophosphates prepared by the method of the invention, it being only necessary that the substituent group or radical be non-reactive under the reaction conditions. Such non-reactive substituents include the chloro, bromo, nitro, alkyl, cycloalkyl and many other groups. Substituted dihalides and intermediate compounds can be prepared substantially by the methods just mentioned for preparing the unsubstituted compounds. Furthermore, substituted alkanols can be used in the process to produce monoaryl di-(substituted alkyl) monothiophosphates provided only that the substituent groups are non-reactive under the reaction conditions. Such non-reactive substituents include the chloro, bromo, alkyl, aryl, cycloalkyl and many other groups. It is understood the substituent groups on the aryl nucleus and on the two alkyl groups can all be different, if desired, and either one, two or all three of these radicals can be free of substituents. It is understood that when referring herein to monoaryl dialkyl monothiophosphates and intermediate compounds, compounds containing non-reactive substituents as defined above are included.

The process of the invention may be represented by the following equations using phosphorus trichloride as the phosphorus trihalide.

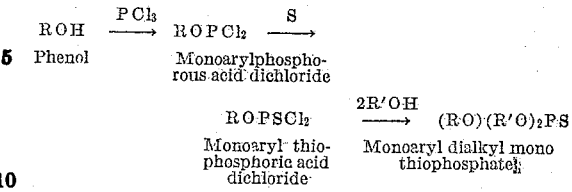

wherein R represents an aryl or substituted aryl radical and R' represents an alkyl or substituted alkyl radical, said substituents being non-reactive under the reaction conditions.

It is also understood that, although the invention is described with particular reference to the use of phosphorus trichloride and to the formation and utilization of chlorine-containing intermediate compounds, other halogen-containing intermediate compounds, e. g., bromine-containing compounds, can be formed and used if desired by using another phosphorus trihalide, e. g., phosphorus tribromide. In the case of the preparation of mono-p-nitrophenyl diethyl monothiophosphate, using phosphorus trichloride as the phosphorus trihalide, for example, the reactions involved are illustrated by the following equations:

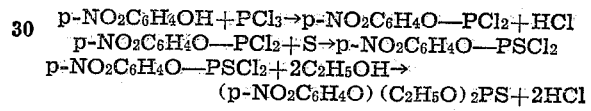

In the foregoing brief description of the process, it is noted that the sulfur is introduced into the molecule following the introduction of the single aryl radical but before the introduction of the two alkyl radicals. This procedure has certain advantages inherent in the method and not possessed by previously described methods. Thus the monoaryl phosphorus acid dichloride appears to be more reactive with sulfur than is a monoaryl dialkyl phosphite and little or no decomposition is observed either of the dichloride during its reaction with sulfur or of the monoaryl monothiophosphoric acid dichloride formed. Purification of the monoaryl thiophosphoric acid dichloride to separate unreacted sulfur therefrom is effected readily in a number of ways, e. g., by distilling the dichloride in vacuo. It is, furthermore, advantageous to react the phosphorous trihalide with a phenol to introduce the aryl group into the molecule first rather than to first introduce the two alkyl groups and then later to introduce the aryl group. It is well known that in most reactions alkanols are more reactive than phenols and it appears that the first halogen atom in a phosphorus trihalide is more reactive than the second and third halogen atoms. The present method therefore reacts the most reactive halogen atom with the least reactive hydroxyl compound and the most reactive hydroxyl compound with the least reactive halogens. In this way, the relatively sluggish reaction between a phenol and the last halogen remaining on the phosphorus atom is avoided.

When following the method herein described, a minimum of manipulation of the monoaryl dialkyl monothiophosphate is required following the last step of the process, the principal impurities remaining in the reaction mixture being a hydrogen halide and any excess of the alkanol which may have been used. These are both readily volatilized at a relatively low temperature and further purification of the mixed ester is usually unnecessary.

Phenols and alkanols which can be used to prepare monothiophosphoric esters utilizing the method of the invention include phenol, cresol, phenylphenol, methanol, ethanol, propanol, butanol, hexanol, p-chlorophenol, p-nitrophenol, o-nitrophenol, m-nitrophenol, o,p-dichlorophenol, methoxyphenol, p-ethoxy-o-cresol, bromophenol, p-acetylphenol, chloroacetylphenol, chloronaphthol, beta-chloroethanol, beta-ethoxyethanol, bromobutanol, chlorobutanol, beta-bromoethanol, chloroisopropanol, beta-acetoxyethanol and many others. Although alkanols containing not more than about 10 carbon atoms are used in a preferred modification of the invention, higher alkanols and their substitution products, such as dodecanol, hexadecanol, chlorohexadecanol, methoxydodecanol and the like, can be used, if desired.

One modification of the invention contemplates the use of substituted alkanols wherein the non-reactive substituent comprises an aromatic nucleus, such as benzyl alcohol, chlorobenzyl alcohol, nitrobenzyl alcohol, methoxybenzyl alcohol, methyl benzyl alcohol, alpha-naphthyl methanol, beta-cyclohexylethanol and the like. Correspondingly substituted dialkyl monoaryl monothiophosphates are formed.

Another modification of the invention contemplates the employment of one molecular proportion of a glycol, such as ethylene glycol, propylene glycol or the polyethylene or polypropylene glycols, instead of two molecular proportions of an alkanol in the last step of the process whereby monothiophosphoric esters are formed having the two alkyl groups inter-connected. An example of such an ester having inter-connected alkyl groups is monoethylene mono-p-nitrophenyl monothiophosphate wherein the two methyl radicals of dimethyl mono-p-nitrophenyl monothiophosphate are inter-connected. The method of the invention will be described with particular reference to the preparation of diethyl p-nitrophenyl monothiophosphate, but it is understood that the method is of general application within the scope of the definitions given.

In the first step of the method wherein phosphorus trichloride is reacted with p-nitrophenyl, the reaction is accomplished conveniently by heating the substances together. The reaction is carried out to advantage in an inert liquid diluent, although the use of such diluent is not essential. Suitable inert diluents include carbon disulfide, carbon tetrachloride, chloroform, benzene, xylene and many others. In a preferred procedure, the diluent and phosphorus trichloride are heated to a reaction temperature and the p-nitrophenol added gradually to the heated mixture. For best results, substantially equi-molecular proportions of phosphorus trichloride and of p-nitrophenol can be used and the reaction carried out at a temperature of from about 30° to about 100° C. However, higher or lower reaction temperatures can be used, if desired. When using carbon tetrachloride, the reaction is carried out conveniently by refluxing the mixture for a short time, e. g. for from about ten to about fifteen minutes. Carbon tetrachloride is then distilled from the mixture and the p-nitrophenyl phosphorous acid dichloride usually used without further purification in the next step of the process. The dichloride can, however, be distilled in vacuo to purify it further, if desired. A substantially quantitative yield of p-nitrophenyl phosphorous acid dichloride is obtained in this manner.

In the second step of the process, the reaction of p-nitrophenyl phosphorous acid dichloride with sulfur is carried out conveniently by heating a mixture of the substances for several hours at a temperature between about 80° and about 225° C., preferably between about 100° and about 200° C. The reaction is usually substantially complete in from two to thirty hours, depending principally upon the temperature employed. The reaction can be carried out either with or without the use of an inert liquid diluent but in most instances the use of a diluent is of little or no advantage. Inert diluents which can be used include those mentioned in the discussion of the first step of the process, the reaction being carried out under super-atmospheric pressure, if desired. When a diluent is employed, it is preferable that it have at least some solvent action on sulfur. When substantially all of the sulfur has reacted, the product, p-nitrophenyl monothiophosphoric acid dichloride, can be isolated by volatilizing any inert diluent included in the mixture in vacuo and, if desired, by distilling the thiodichloride in vacuo. Generally, however, the dichloride can be used without further purification directly for the preparation of the dialkyl monoaryl monothiophosphate. The sulfur reactant can, if desired, be employed in the form of an alkali metal polysulfide, such as sodium polysulfide, potassium polysulfide or calcium polysulfide.

In the third step of the process, the reaction of the n-nitrophenyl monothiophosphoric acid dichloride with ethanol is carried out conveniently by heating substantially one molecular proportion of the former with about two molecular proportions of the latter, preferably in the presence of about two molecular proportions of a hydrogen halide acceptor, such as pyridine, quinoline, picoline and the like. Generally speaking, an inert diluent is not necessary at this stage of the process although a diluent, such as those mentioned in the discussion of the first step of the process, can be included in the reaction mixture, if desired. The reaction takes place rapidly, particularly when a hydrogen halide acceptor is included in the mixture, at slightly elevated temperatures, e. g. at from about 20° to about 60° C., and is substantially complete in from a few minutes to a few hours. The diethyl p-nitrophenyl monothiophosphate can be recovered readily by adding water to the reaction mixture and separating the two layers which are formed. The aqueous layer containing the hydrochloride of the hydrogen halide acceptor, e. g. pyridine hydrochloride, can be separated and treated, e. g.

with alkali, and the hydrogen halide acceptor recovered for re-use. The non-aqueous layer, which consists of the diethyl p-nitrophenyl monothiophosphate and any water-insoluble inert diluent which may be present in the reaction mixture, can be separated and fractionally distilled to remove moisture and recover the inert diluent. The diethyl p-nitrophenyl monothiophosphate which remains can, if desired, be purified by distillation in vacuo but is usually of sufficient purity for most uses without distillation.

As mentioned previously, certain of the dialkyl monoaryl monothiophosphates are useful as insecticides. They are also useful as intermediates in the preparation of other insecticidally active compounds including such compounds as tetraesters of dithiopyrophosphoric acid and of thiopyrothiophosphoric. These acids are thought to have the formulae $$(HO)_2PS-O-PS(OH)_2$$

and $$(HO)_2PS-S-PO(OH)_2$$

respectively. These products are prepared by heating a dialkyl monoaryl monothiophosphate with phosphorus pentasulfide, preferably at temperatures of from about 100° to about 200° C.

In somewhat similar fashion, the dialkyl monoaryl monothiophosphates when heated with phosphorus pentoxide are converted to compounds thought to be tetraesters of a monothiopyrophosphoric acid having the probable formula $$(HO)_2PS-O-PO(OH)_2$$

It should be pointed out further that, although the present invention has been described with respect to sulfur-containing compounds, the invention also contemplates the preparation of insecticidally useful compounds using selenium or tellurium instead of sulfur, the reactants, procedures and products being otherwise similar to those herein described.

Certain advantages of the invention are apparent from the following example which is given by way of illustration. only and is not to be construed as limiting.

*Example*

A mixture of 150 grams of carbon tetrachloride and 135 grams of phosphorus trichloride was heated at about 60° C. and 135 grams of p-nitrophenol stirred into the heated mixture over a period of about 15 minutes. Copious fumes of hydrogen chloride were evolved throughout the addition of the p-nitrophenol.

Upon distilling carbon tetrachloride from the reaction mixture and continuing the distillation in vacuo there was obtained a substantially quantitative yield of p-nitrophenyl phosphorous acid dichloride.

A duplicate reaction mixture, prepared using carbon tetrachloride, p-nitrophenol and phosphorus trichloride as described above was heated sufficiently to drive off only a part of the carbon tetrachloride and the residue added to 34 grams of sulfur. The entire mixture was heated under reflux until substantially all of the sulfur had dissolved. The temperature of the refluxing mixture was about 100° C. at the beginning of the refluxing period but rose somewhat during the 24 hours the refluxing was continued. The mixture was then cooled and filtered through glass wool to remove a small amount of unreacted sulfur. The filtered mixture was heated to volatilize carbon tetrachloride and the residue distilled in vacuo. A substantially quantitative yield of p-nitrophenyl monothiophosphoric acid dichloride was obtained.

The distilled p-nitrophenyl monothiophosphoric acid dichloride was added gradually to a mixture of 100 grams of anhydrous ethanol and 158 grams of pyridine while maintaining the temperature of the mixture at about 60° C. A rapid reaction occurred and the mixture was held at about 60° C. for about 30 minutes after the addition was complete and then cooled and stirred slowly into 700 milliliters of water. Two layers formed which were separated. The heavy water-immiscible layer was washed with dilute aqueous hydrogen chloride to remove any traces of pyridine therein. The washings and aqueous layer were combined and alkalized for the recovery of pyridine in conventional manner. The washed oily layer was heated to volatilize moisture and the residue distilled in vacuo. An overall yield of about 85 per cent of the theoretical amount of diethyl p-nitrophenyl monothiophosphate was obtained, based on the p-nitrophenol used.

I claim:

1. The method which includes: subjecting a monoaryl monothiophosphoric acid dihalide having the formula $$ROPSX_2$$

wherein R is from the group consisting of aryl radicals and substituted aryl radicals wherein the substituent is non-reactive under the reaction conditions and X represents halogen, to the action of about two molecular proportions of an alkanol having the formula $$R'OH$$

wherein R' is from the group consisting of alkyl radicals and substituted alkyl radicals wherein the substituent is non-reactive under the reaction conditions, to form a monoaryl dialkyl monothiophosphate having the formula $$RO(R'O)_2PS$$

2. The method of claim 1 wherein the monoaryl monothiophosphoric acid dihalide is subjected to the action of an alkanol at a temperature between about 20° and about 60° centigrade.

3. The method of claim 1 wherein the monoaryl monothiophosphoric acid dihalide is subjected to the action of an alkanol under the influence of a hydrogen halide acceptor.

THOMAS F. CLEARY, Jr.

REFERENCES CITED

The following references are of record in the file of this patent:

UNITED STATES PATENTS

| Number | Name | Date |
|---|---|---|
| 1,982,903 | Clemmensen | Dec. 4, 1934 |
| 2,250,049 | Moyle | July 22, 1941 |

OTHER REFERENCES

Anschutz et al., "Annalen der Chemie," vol. 253 (1889), pages 115-119.

Strecker et al., "Ber. deutsch Chem. Ges.," vol. 49 (1916), page 76.

F. I. A. T. Final Report No. 949, "Organic Chemical Intermediates for Insecticides, Fungicides and Rodenticides," by J. T. Thurston, dated 14 October, 1946, pages 19, 20 (Office of Publications Board, U. S. Department of Commerce Publication No. P. B. 60,890).

Strecker, Ber. der deutsch Chem., vol. 49 (1916), page 87.